(12) United States Patent
Deal

(10) Patent No.: US 10,384,919 B2
(45) Date of Patent: Aug. 20, 2019

(54) MOBILE BOTTLING, PACKAGING AND DISTRIBUTION SYSTEM

(71) Applicant: Troy L. Deal, Abilene, TX (US)

(72) Inventor: Troy L. Deal, Abilene, TX (US)

( * ) Notice: Subject to any disclaimer, the term of this patent is extended or adjusted under 35 U.S.C. 154(b) by 585 days.

(21) Appl. No.: 14/871,527

(22) Filed: Sep. 30, 2015

(65) Prior Publication Data
US 2016/0200560 A1   Jul. 14, 2016

Related U.S. Application Data

(60) Provisional application No. 62/084,529, filed on Nov. 25, 2014.

(51) Int. Cl.
| | | |
|---|---|---|
| *B67C 3/00* | (2006.01) | |
| *B67C 3/04* | (2006.01) | |
| *C02F 1/44* | (2006.01) | |
| *B67C 3/22* | (2006.01) | |

(52) U.S. Cl.
CPC ............... *B67C 3/008* (2013.01); *B67C 3/04* (2013.01); *B67C 2003/227* (2013.01); *C02F 1/441* (2013.01)

(58) Field of Classification Search
CPC ..... B67C 3/008; B67C 3/04; B67C 2003/227; C02F 1/441
USPC ........................................................ 53/111 R
See application file for complete search history.

(56) References Cited

U.S. PATENT DOCUMENTS

| | | | | |
|---|---|---|---|---|
| 1,727,340 A | * | 9/1929 | Flory ................. | E01C 19/1027 126/343.5 A |
| 3,263,971 A | * | 8/1966 | Farnham ............ | E01C 19/1068 118/685 |
| 3,268,342 A | * | 8/1966 | Yatuni ..................... | A01J 11/00 426/392 |
| 3,316,830 A | * | 5/1967 | Biehl ..................... | A23N 17/00 241/101.3 |
| 3,387,827 A | * | 6/1968 | Carlyon, Jr. ......... | A01C 23/042 366/160.3 |
| 3,780,644 A | * | 12/1973 | Canfield .................. | A01J 11/00 99/455 |
| 3,832,201 A | * | 8/1974 | Shearer ................. | E01C 19/105 106/281.1 |
| 3,990,684 A | * | 11/1976 | Seskin .................... | E01C 19/45 366/10 |
| 4,104,813 A | * | 8/1978 | Lindsey ..................... | E02F 3/90 114/344 |
| 6,190,558 B1 | * | 2/2001 | Robbins ............... | B01D 61/025 210/134 |
| 6,436,264 B1 | * | 8/2002 | Tamura .................. | B01D 61/46 204/634 |
| 6,495,014 B1 | * | 12/2002 | Datta ..................... | B01D 61/48 204/252 |
| 7,040,430 B2 | * | 5/2006 | Nomura ..................... | B60K 1/04 180/53.5 |

(Continued)

*Primary Examiner* — Sameh Tawfik
(74) *Attorney, Agent, or Firm* — Roy A. Ekstrand

(57) ABSTRACT

A mobile bottling and distribution system that improves the efficiency and lowers the overall operating costs associated with the mixing, blending, bottling, shipping and distribution of liquid products of various viscosities by providing a plurality of smaller self-contained facilities which are preferably housed upon a plurality of over the road type trailers each being capable of being moved from location to location by conventional over the road tractors.

4 Claims, 14 Drawing Sheets

(56) References Cited

U.S. PATENT DOCUMENTS

| | | | | |
|---|---|---|---|---|
| 7,631,659 | B2* | 12/2009 | Schneider | B60P 3/16 |
| | | | | 137/571 |
| 8,056,270 | B1* | 11/2011 | Maitlen | E02F 3/8841 |
| | | | | 37/345 |
| 9,022,687 | B2* | 5/2015 | Smith | E02F 7/06 |
| | | | | 405/80 |
| 9,567,249 | B2* | 2/2017 | Mierzejewski | C02F 1/441 |
| 9,573,098 | B2* | 2/2017 | Lechuga Andrade | |
| | | | | B01D 61/08 |
| 9,597,638 | B2* | 3/2017 | Zhu | B01D 61/06 |
| 2002/0023865 | A1* | 2/2002 | Northcut | B01D 29/114 |
| | | | | 210/192 |
| 2002/0139676 | A1* | 10/2002 | Moulin | B01D 61/48 |
| | | | | 204/632 |
| 2006/0144787 | A1* | 7/2006 | Schmidt | B01D 61/025 |
| | | | | 210/637 |
| 2011/0302881 | A1* | 12/2011 | Van Steen | B67C 3/008 |
| | | | | 53/127 |

* cited by examiner

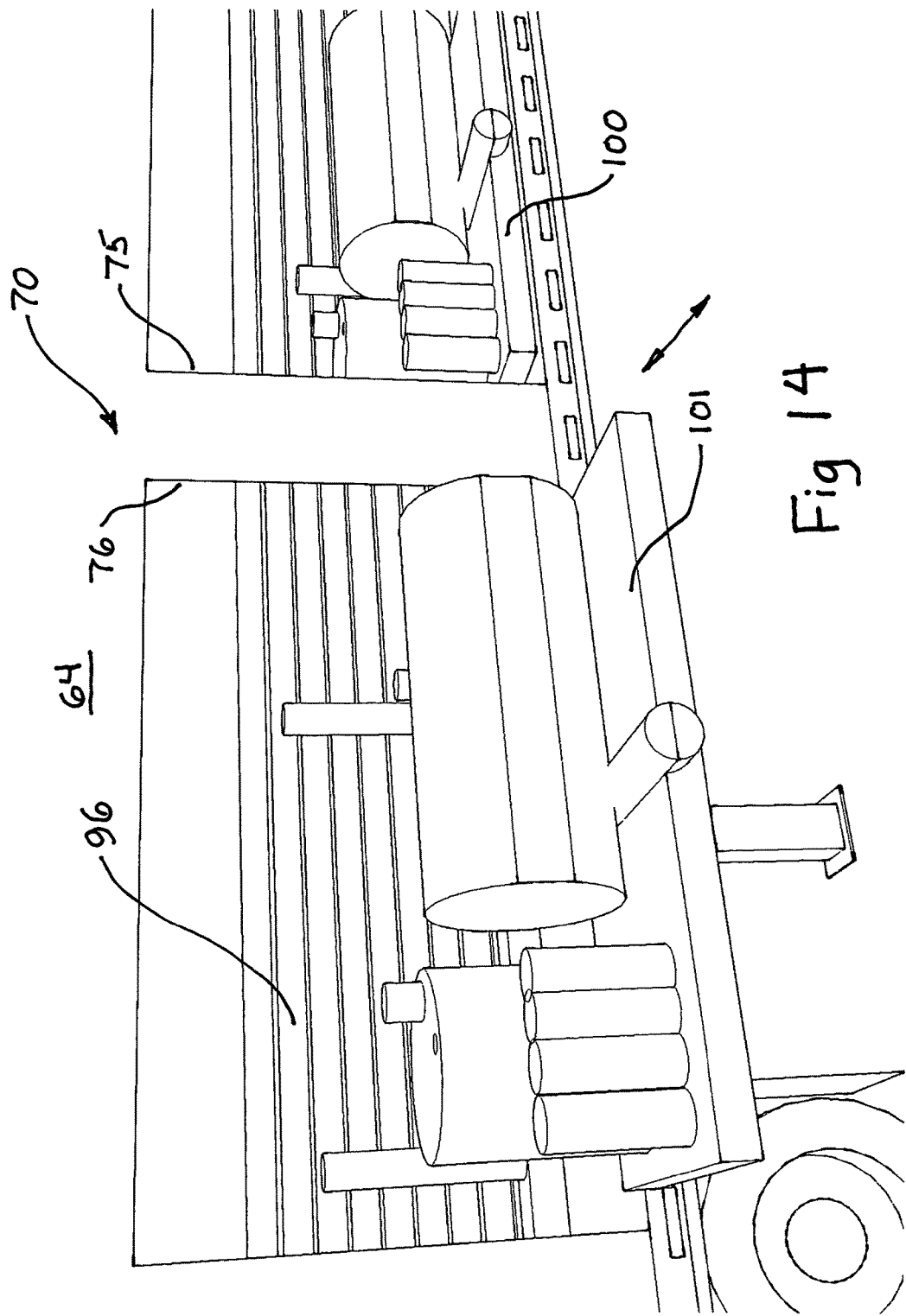

MOBILE BOTTLING, PACKAGING AND DISTRIBUTION SYSTEM

CROSS-REFERENCE TO RELATED APPLICATION

This application claims the benefit of and priority under 35 U.S.C. 119(e) of U.S. Provisional Patent Application No. 62/084,529 entitled MOBILE BOTTLING AND DISTRIBUTION SYSTEM, filed Nov. 25, 2014 in the name of Troy Deal, the disclosure of which is incorporated herein by reference.

FIELD OF THE INVENTION

This invention relates generally to the bottling, transportation and distribution of commercial and industrial liquids and relates particularly to novel mobile bottling, shipping and distribution centers.

BACKGROUND OF THE INVENTION

Many commercial and industrial products are liquids such as cleaning chemicals, solvents, lubricants, water and other industrial chemicals and the like. Such products are presently bottled in bottles, jugs, pails, drums and other containers that are distributed utilizing an accumulating facility fabricated to provide the accumulation of a supply of the liquid product together with extensive high speed bottling and filling facilities. Such bottling facilities are subject to economic considerations which require the limitation of their locations to portions of the distribution area which process and service large volumes of the liquid product. As a result, such bottling and distribution centers tend to be extremely large and the distribution of bottled product involves long distance shipping and costs attendant thereto. For the most part, the raw liquid product or its constituents are shipped in bulk to storage facilities within the bottling plant together with appropriate supplies of empty containers, labels and various shipping cartons or boxes. In attempting to maximize efficiency, bottlers tend to operate multiple high speed bottling lines which tolerate very little variation and flexibility. During such bottling, the empty bottles or other liquid containers are arranged in extended lines in which automated filling, capping and sealing of the bottles takes place. In many, if not most such bottling lines, various labels are also applied. The completed and bottled product is then typically packed within boxes or shipping cartons and arranged on shipping pallets. In some operations, large volume containers are shipped directly on specialized pallets without the need for boxes or cartons. The completed palletized product is then distributed to a plurality of localized distribution centers from which the product is further spread out and distributed to more localized merchandisers. Products flow through streams of commerce characteristic of various industries such as automotive products, commercial chemical products, specialized trucking industries and so on.

While the shipping costs associated with all such liquid products form an undesired portion of the total cost of product processing, in certain liquids the product volume and weight disproportionally increases operating costs to prohibitive portions. One such product which is known in the diesel industry as Diesel Exhaust Fluid, or "DEF" serves as an excellent example of the disproportionate increase of shipping and distributing costs of high volume, high weight liquids. Other similar liquid products associated with high weight and large volume are found in the various high viscosity products such as grease, lubricating oils and the like.

Faced with the prohibitive effect of high shipping costs upon overall product and system costs associated with widely dispersed large volume bottling facilities, practitioners in the art are desperate to reduce the ever-increasing shipping cost. There arises therefore an unfilled and unresolved need in the art for ever more efficient, low cost and more effective systems for shipping and distributing large volume high weight liquid products such as DEF.

SUMMARY OF THE INVENTION

Accordingly, it is a general object of the present invention to provide a lower cost and more efficient system for bottling, shipping and distributing of commercial, industrial and consumer liquid product materials. It is a more particular object of the present invention to provide an improved lower cost and more efficient system for the bottling, packaging, shipping and distribution of large volume, high weight liquids such as DEF and the like.

In accordance with the present invention, there is provided, a liquid product system comprising: a molding and packaging unit supported upon a first mobile trailer; a filling and palletizing unit supported upon a second mobile trailer; a delivery unit supported upon a third mobile trailer; a first bridge connecting the molding and packaging unit and the filling and palletizing unit; a second bridge connecting the filling and palletizing unit to the delivery unit; and a source of bulk liquid product coupled to the filling and palletizing unit, the bulk liquid product being bottled within the filling and palletizing unit using bottles from the molding and packaging unit and thereafter transferred to the delivery unit for local shipment, and the molding and packaging unit, the filling and palletizing unit, the delivery unit and the first and second bridges being transported upon the first, second and third mobile trailers to be moved from operational location to successive operational locations.

Thus, the present invention provides a system for improved, more cost effective and efficient mixing, bottling, shipping and distribution of liquid products by utilizing a plurality of mobile self-contained bottling, packaging and shipping systems which reduces the land area required for the facility and the environmental impact of the facility. The reduced land area, typically referred to as the "footprint" is obtained by housing an entire self-contained bottling, packaging, palletizing and shipping system upon a plurality of trailers. The use of a plurality of trailers for housing the mixing, bottling, packaging and distribution system allows the entire facility to also be entirely mobile. In the preferred fabrication of the present invention, a plurality of highly modified specialized trailers are moved and collected at a desired area for the operation. In the preferred location for the mobile facility, proximity to bulk shipping capability such as railroad track and/or commercial highways and a local source of water, such as municipal water, is preferred. The use of a mobile facility allows a operation of the system for short periods of time in a given locale thereby avoiding the need for costly permanent facilities. Thus, a mobile mixing, bottling and distribution system for liquid products constructed in accordance with the present invention may readily be moved from location to location to supply packaged and bulk liquid products directly to local end users or localized distributers thereby avoiding the need for long distance highly expensive shipping operations.

In one type of a typical operation in accordance with the present invention, a trio of highly specialized over the road trailers is brought to a chosen location by a plurality of tractors. Once at the location, the specialized trailers are arranged in an operational configuration which suits the footprint of land available at the given location. The first trailer utilized in the example of the present invention system is generally referred to as the molding and packaging unit. The second specialized trailer is generally referred to as the filling and palletizing unit and the third specialized trailer is generally referred to as the delivery/support unit. In a typical system in accordance with the present invention, the molding and packaging unit includes a utility unit which provides locally generated electrical power, vacuum heating and air conditioning and compressed air for the entire mobile bottling and distribution system. The utility unit also provides an air-conditioning system. The molding and packaging unit is operated in accordance with either a storage and handling operation suited to the processing of pre-molded liquid containers or provides an online container molding operation. Supplies of raw material for the online molding operation and/or supplies of pre-molded empty containers are provided to and stored within the molding and packaging unit and may also be stored in additional units. The output produced by the molding and the packaging unit comprises a supply of properly prepared empty liquid containers which are transferred to the filling and palletizing unit. In the preferred fabrication of the present invention, the filling and palletizing unit utilizes a liquid storage tank which is either supported within the filling and palletizing unit or, alternatively, is positioned adjacent thereto. In addition, in the preferred fabrication of the present invention, the mobile system is located near a delivery access for bulk tankers to supply liquid to the filling and palletizing unit or, alternatively, a railroad spur which allows the temporary positioning of a bulk tanker car in proximity to the filling and palletizing unit or the mobile mixing system. With a supply of empty liquid containers from the molding and packaging unit and a supply of bulk liquid product from either a local support tank or a volume tanker, the filling and palletizing unit utilizes an onboard high speed bottling line to fill, cap and seal the liquid within the liquid containers. The filling and palletizing unit also further provides for packing of filled liquid containers within appropriate shipping cartons and for the palletizing of completed liquid product upon appropriate shipping pallets. The output of the filling and palletizing unit is then transferred to the delivery unit. The delivery unit accumulates the completed palletized output product for efficient transfer to a plurality of delivery vehicles. In many instances, the delivery vehicles comprise a queue of local delivery trucks which then receive and distribute the palletized completed liquid products to local end users and local distribution facilities.

In the anticipated use of the present invention mobile bottling and distribution system, the operations of the system at any given location will tend to be short term temporary operations. Thus, an increased efficiency is provided by repeatedly moving the entire system due to its mobility to other suitable locations within the distribution area. In this manner, the long distance, high cost shipping incurred by larger more centralized bottling and distribution systems is avoided. In addition, the temporary use of land for a given local operation is lower in cost and therefore more efficient than dedicated large volume centralized bottling facilities. In accordance with an important aspect of the present invention system, the environmental impact and environmental stress are distributed and spread among a large number of smaller sized multiple facilities rather than being concentrated in a lesser number of larger centrally located facilities.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 14 sets forth an enlarged partial assembly perspective view of a water processing and blending trailer used in the alternate embodiment of the present invention mixing, blending and water processing system of the mobile bottling and distribution system constructed in accordance with the present invention.

DESCRIPTION OF THE PREFERRED EMBODIMENTS

By way of overview, the present invention improves the efficiency and lowers the overall operating costs associated with the bottling, shipping and distribution of large volume liquid products by providing a plurality of smaller self-contained facilities which are preferably housed upon a plurality of over the road type trailers capable of being moved from location to location by conventional over the road tractors. Alternatively, the inventive system may be housed and transported by railroad or watercraft systems. Once the desired site for operation is selected, the smaller self-contained trailers are preferably positioned in proximity to a source of bulk material. Often the facility is positioned on a portion of land which is adjacent to a convenient railroad spur thereby allowing the temporary positioning of a railroad bulk tanker of liquid product adjacent to the processing operation. Alternatively, the site chosen for the temporary setup of the mobile system may be adjacent to a road or highway sufficient to allow highway transport of bulk material using bulk tractor trailer systems. By way of further alternative embodiments, the present invention system may include water processing apparatus together with one, or more, mixing and blending systems and a contained source of product concentrate to mix and blend product on site. The remaining self-contained elements on the system trailers include localized electric power generation as well as compressed air facilities. These are used to supply electrical power, compressed air, vacuum and heating and air conditioning to the entire mobile facility. While the present invention system may be utilized in a long term operation with great efficiency due to the small footprint of land required and the high efficiency of operation, in the preferred fabrication of the present invention the self-contained completely mobile character of the inventive system facilitates a "circuit" approach to distribution. In this circuit approach, the inventive system is repeatedly moved from one location to another after short operational times. It is anticipated that brief periods of operation at a substantial number of locations will meet the localized demand for the bottled liquid product with little or no shipping costs and allow the system to be subsequently moved to the next location. In this manner, a relatively large distribution area may be serviced in an extremely efficient and low cost operation. The fact that the entire system is entirely self-contained including supplies of material and operational power allows the system to utilize locations at which little if any support capability is available.

Figure 1:
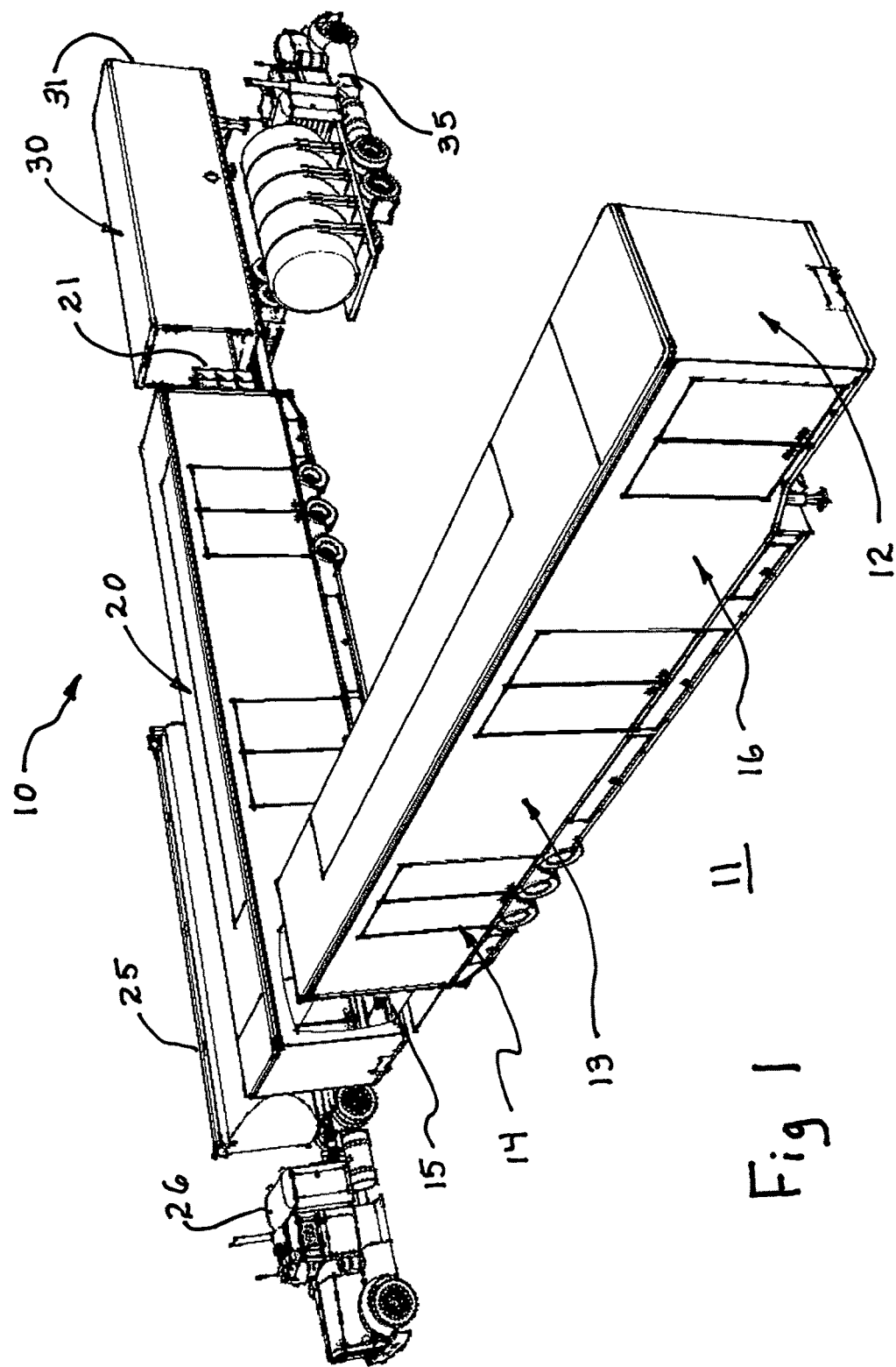
FIG. 1 sets forth a perspective view of a mobile bottling and distribution system constructed in accordance with the present invention.

More specifically, FIG. 1 sets forth a perspective view of an embodiment of the present invention in which a mobile bottling, packaging, labeling and distribution system is provided which is generally referenced by numeral 10. In the configuration of system 10 set forth in FIG. 1, the operative units are arranged in a "L-shaped" configuration. With temporary reference to FIG. 4, it will also be noted that the present invention is not limited to an L-shaped configuration but rather may, alternatively, be configured in a more in-line configuration to reduce the operating footprint of the system. Returning to FIG. 1, system 10 includes a trio of mobile trailer units 12, 20 and 30 arranged in the above-described L-shaped configuration. Unit 12 is generally described as a molding and packaging unit and thus includes a container packaging line 13 (seen below in FIG. 6). Molding and packaging unit 12 further includes a utility unit 16 constructed in accordance with the present invention and providing a motor generator for generation of electrical power together with other utility apparatus such as air compressor systems and, if needed, an air-conditioning system also fabricated in accordance with conventional fabrication techniques. Molding and packaging unit 12 further includes a container molding line 14 (seen in FIG. 6). The output end of molding and packaging unit 12 is coupled to a bridge 15 which extends from the output end of molding and packaging unit 12 to the input end of filling and palletizing unit 20. Filling and palletizing unit 20 is also supported upon a mobile trailer and is coupled to bridge 15 to receive a supply of empty liquid containers from molding and packaging unit 12. Filling and palletizing unit 20 includes a high speed liquid bottling line within which the liquid product bottles are filled, capped and sealed. The filled liquid containers are then packed within appropriate shipping boxes or cartons and arranged upon conventional pallets (not shown). The palletized output product of filling and palletizing unit 20 is transferred across a bridge 21 to delivery unit 30. Within delivery unit 30, the palletized output is arranged for delivery to a plurality of bulk local delivery trucks, such as truck 35, which queue up at the output end of delivery unit 30 to transfer product and provide localized distribution.

As mentioned above, the preferred configuration of the present invention mobile bottling and distribution system utilizes a proximate source of bulk liquid material to supply the filling and bottling operation taking place on unit 20. In the example shown in FIG. 1, this bulk supply of to-be-bottled liquid is received from a bulk supply tanker trailer 25. Trailer 25 includes conventional apparatus for pumping the bulk liquid material from the tanker to the desired location within filling and palletizing unit 20. Also in the example shown, a tractor 26 utilized in positioning trailer 25 is shown. In most operations, the continued presence of tractor 26 is not necessary and thus tractor 26 may leave trailer 25 at the location. It will be recalled that the bulk supply of to-be-bottled liquid material may also be provided by a conventional railroad tanker (not shown). Once the operation at a given temporary location is complete and the local needs for the bottled product have been satisfied, bridges 15 and 21 are separated from units 20 and 30. Thereafter, the plurality of trailers are coupled to their respective over-the-road tractors and the entire facility is transported to the next location for operation.

Figure 2:
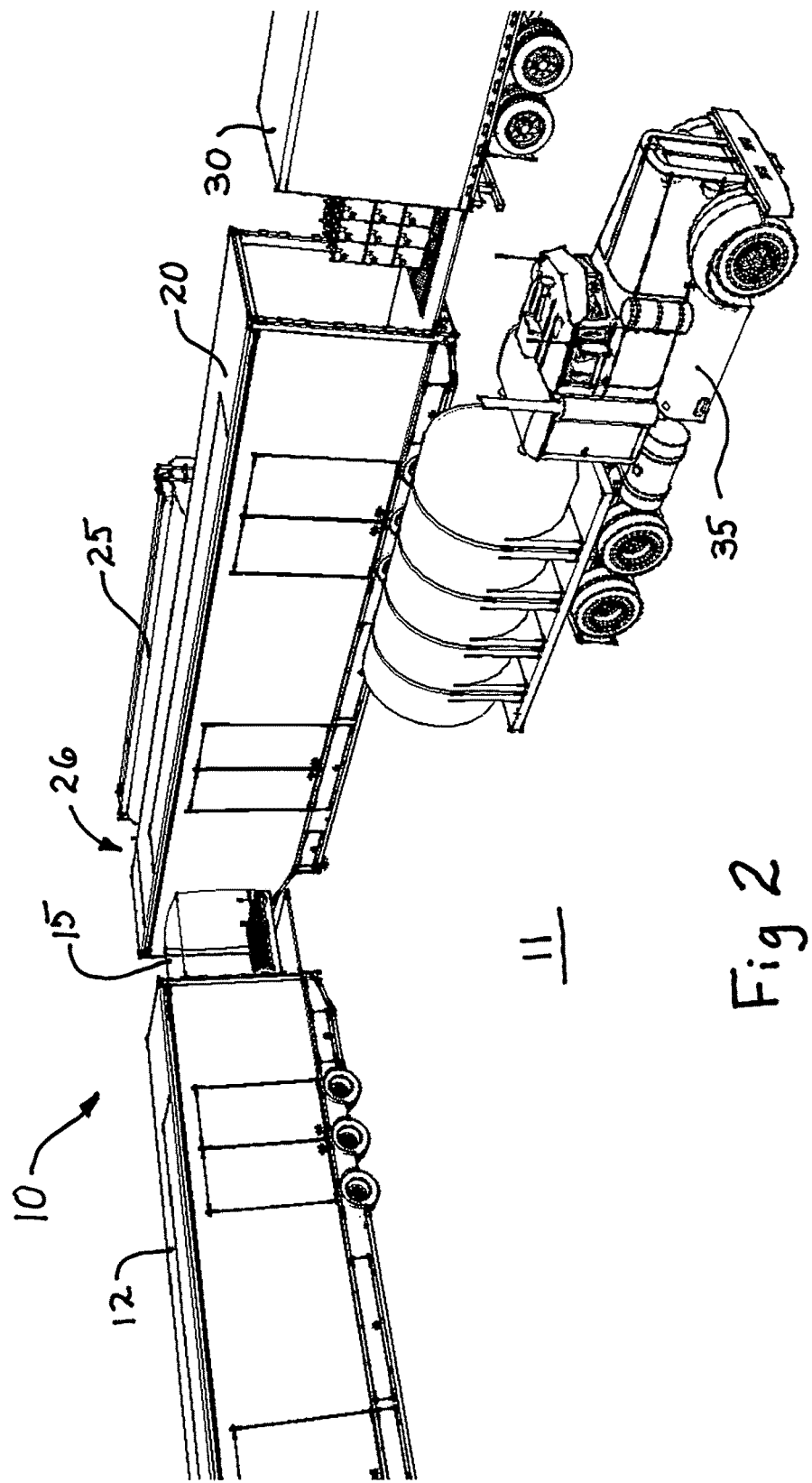
FIG. 2 sets forth a further perspective view of the present invention mobile bottling and distribution system.

FIG. 2 sets forth a further perspective view of mobile bottling and distribution system 10. As described above, mobile bottling and distribution system 10 includes molding and packaging unit 12, a filling and palletizing unit 20 and a delivery unit 30. As is also described above, system 10 is arranged in an L-shaped configuration in the embodiment show in FIGS. 1 and 2, but may also be arranged in an alternate configuration such as the configuration set forth in FIG. 4 as well as other configurations without departing from the spirit and scope of the present invention.

Figure 3:
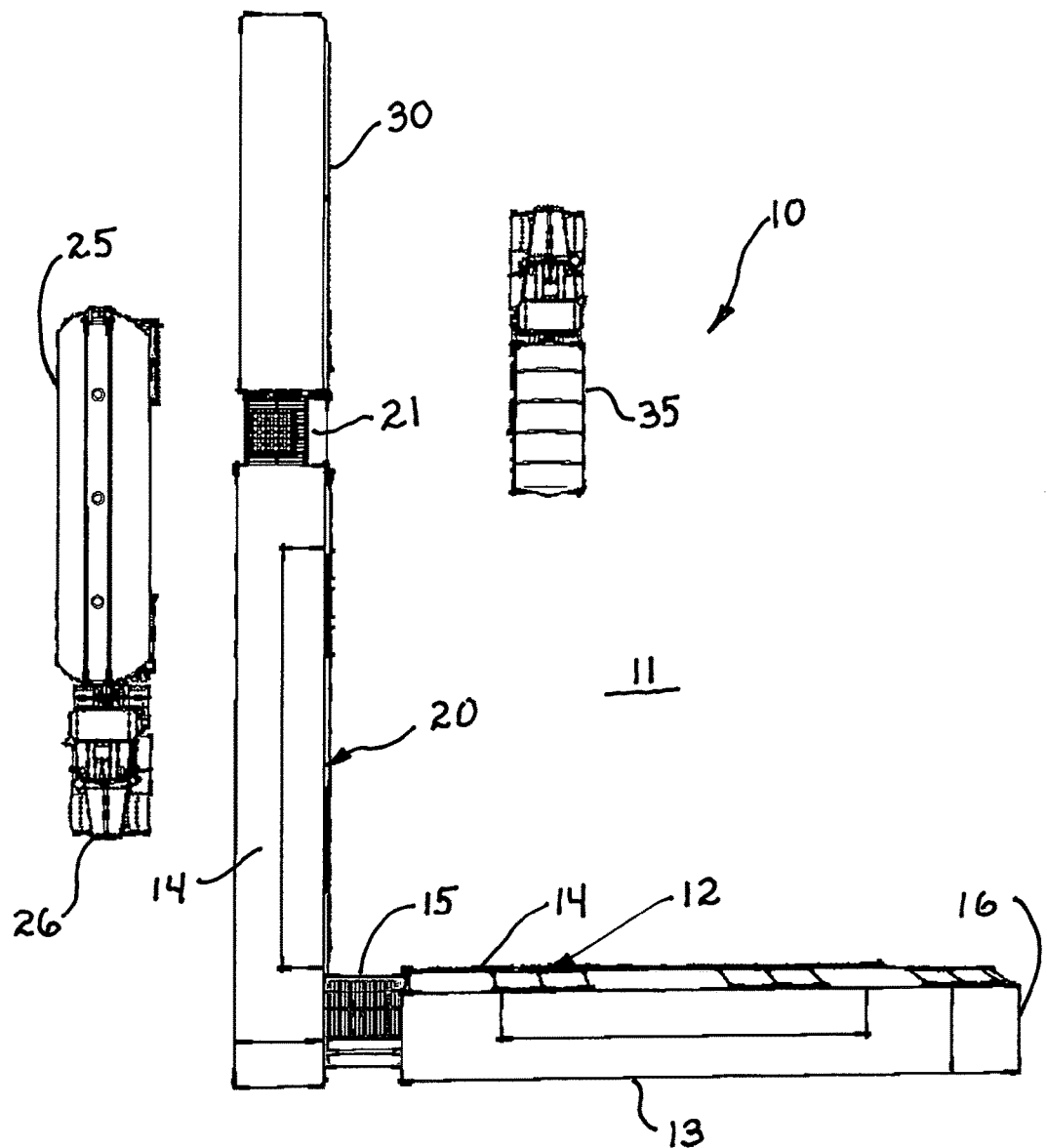
FIG. 3 sets forth a top plan view of the embodiment of the present invention mobile bottling and distribution system set forth in FIGS. 1 and 2.

FIG. 3 sets forth a top plan view of mobile bottling and distribution system 10 arranged in the L-shaped configuration shown in FIGS. 1 and 2. As is described above, system 10 includes a trio of mobile trailer units 12, 20 and 30 arranged in the above-described L-shaped configuration. Unit 12 is generally described as a molding and packaging unit and thus includes a container packaging line 13 (seen below in FIG. 6). Molding and packaging unit 12 further includes a utility unit 16 constructed in accordance with the present invention and providing a motor generator for generation of electrical power together with other utility apparatus such as air compressor systems and, if needed, an air-conditioning system also fabricated in accordance with conventional fabrication techniques. Molding and packaging unit 12 further includes a container molding line 14 (seen in FIG. 6). The output end of molding and packaging unit 12 is coupled to a bridge 15 which extends from the output end of molding and packaging unit 12 to the input end of filling and palletizing unit 20. Filling and palletizing unit 20 is also supported upon a mobile trailer and is coupled to bridge 15 to receive a supply of empty liquid containers from molding and packaging unit 12.

As is also described above, filling and palletizing unit 20 includes a high speed liquid bottling line within which the liquid product bottles are filled, capped and sealed. The filled liquid containers are then packed within appropriate shipping boxes or cartons and arranged upon conventional pallets (not shown). The palletized output product of filling and palletizing unit 20 is transferred across a bridge 21 to delivery unit 30. Within delivery unit 30, the palletized output is arranged for delivery to a plurality of bulk local delivery trucks which queue up at the output end of delivery unit 30 to transfer product and provide localized distribution.

Figure 4:
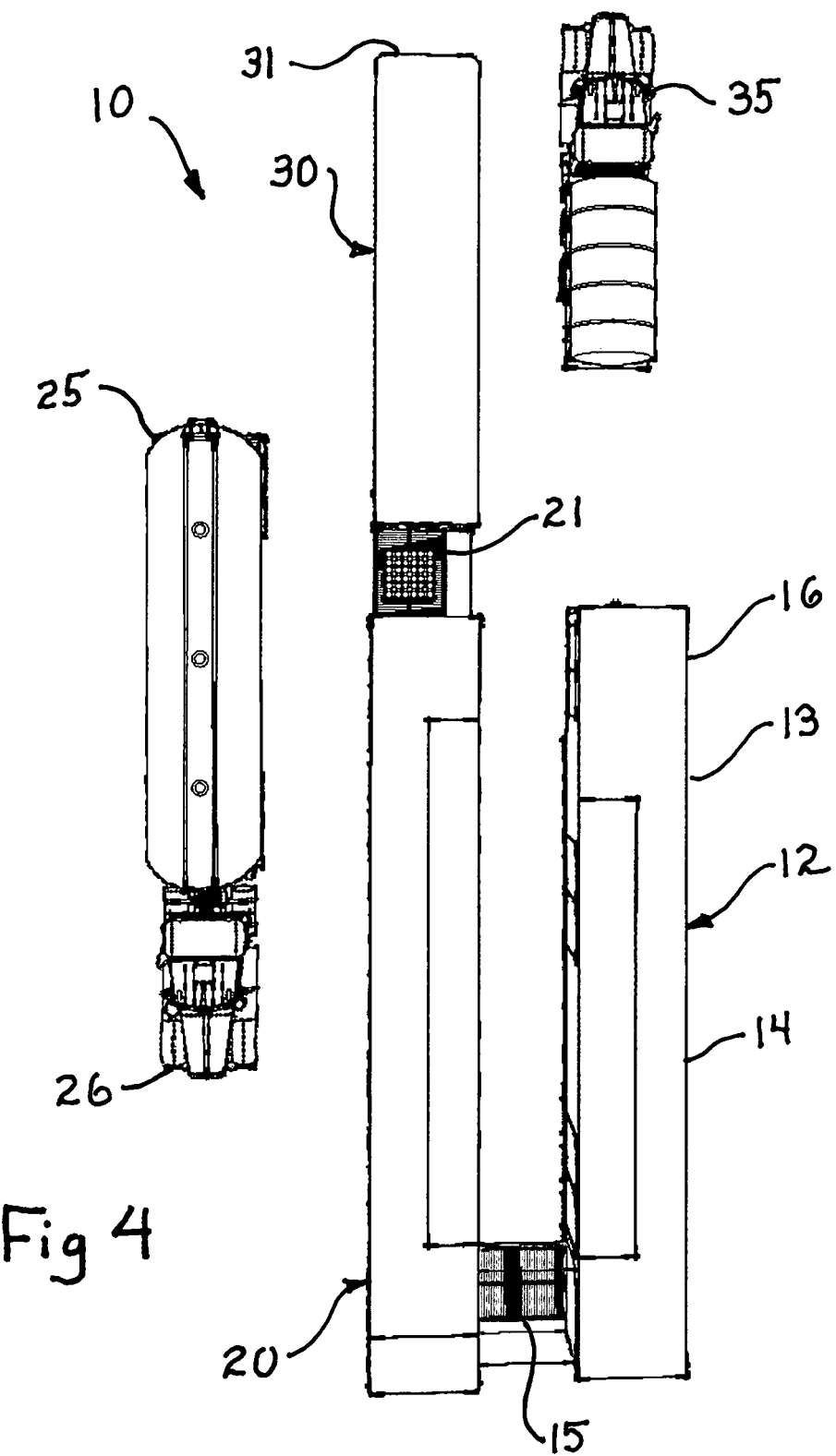
FIG. 4 sets forth a top plan view of an alternate embodiment of the present invention mobile bottling and distribution system.

FIG. 4 sets forth a top plan view of an alternate embodiment of the present invention mobile bottling and distribution system generally, referenced by numeral 50, in which the trailer units are arranged in a generally parallel configuration. Molding and packaging unit 12 includes a container packaging line, a utility unit, constructed in accordance with the present invention and providing a motor generator for generation of electrical power together with other utility apparatus such as air compressor systems. Molding and packaging unit 12 further includes a container molding line. The output end of molding and packaging unit 12 is coupled to a bridge 15 which extends from the output end of molding and packaging unit 12 to the input end of filling and palletizing unit 20. Filling and palletizing unit 20 is coupled to bridge 15 to receive a supply of empty liquid containers from molding and packaging unit 12.

Despite the differences of the configurations between mobile bottling and distribution system 50 and mobile bottling and distribution system 10, the operation of mobile bottling and distribution system 10, described above in conjunction with FIGS. 1 and 2 will be understood to apply equally well and be equally descriptive of mobile bottling and distribution system 50. The primary reason for the different configuration of mobile bottling and distribution system 50 is to accommodate an alternate site shape.

Figure 5:
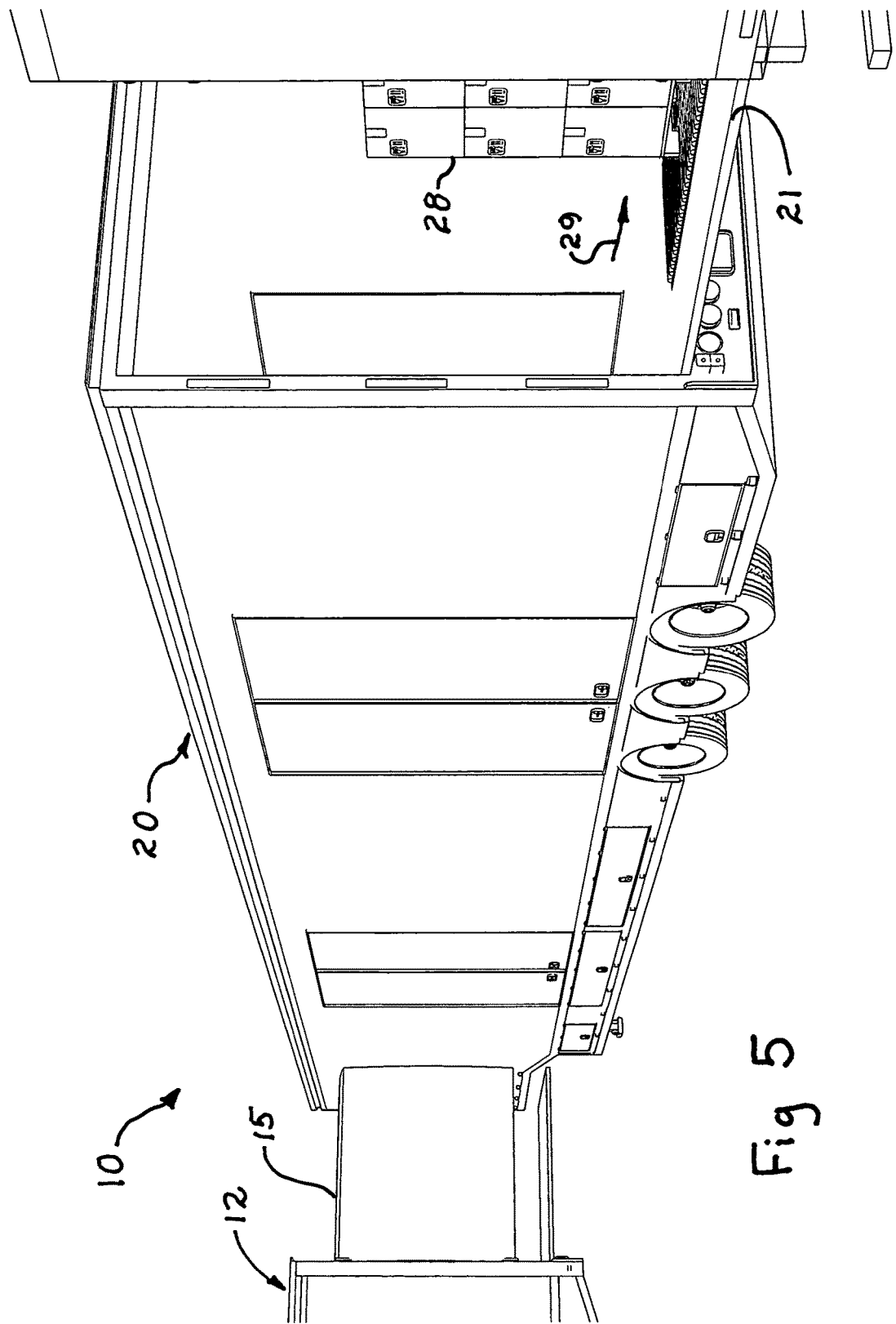
FIG. 5 sets forth an enlarged perspective view of a portion of the filling and packaging unit of the present invention mobile bottling and distribution system.

FIG. 5 sets forth an enlarged perspective view of a portion of filling and palletizing unit 20. joined to molding and packaging unit 12. Of importance to note is the open end of filling and palletizing unit 20 showing a palletized load of product 28 moving from filling and palletizing unit 20 in the direction indicated by arrow 29.

Figure 6:
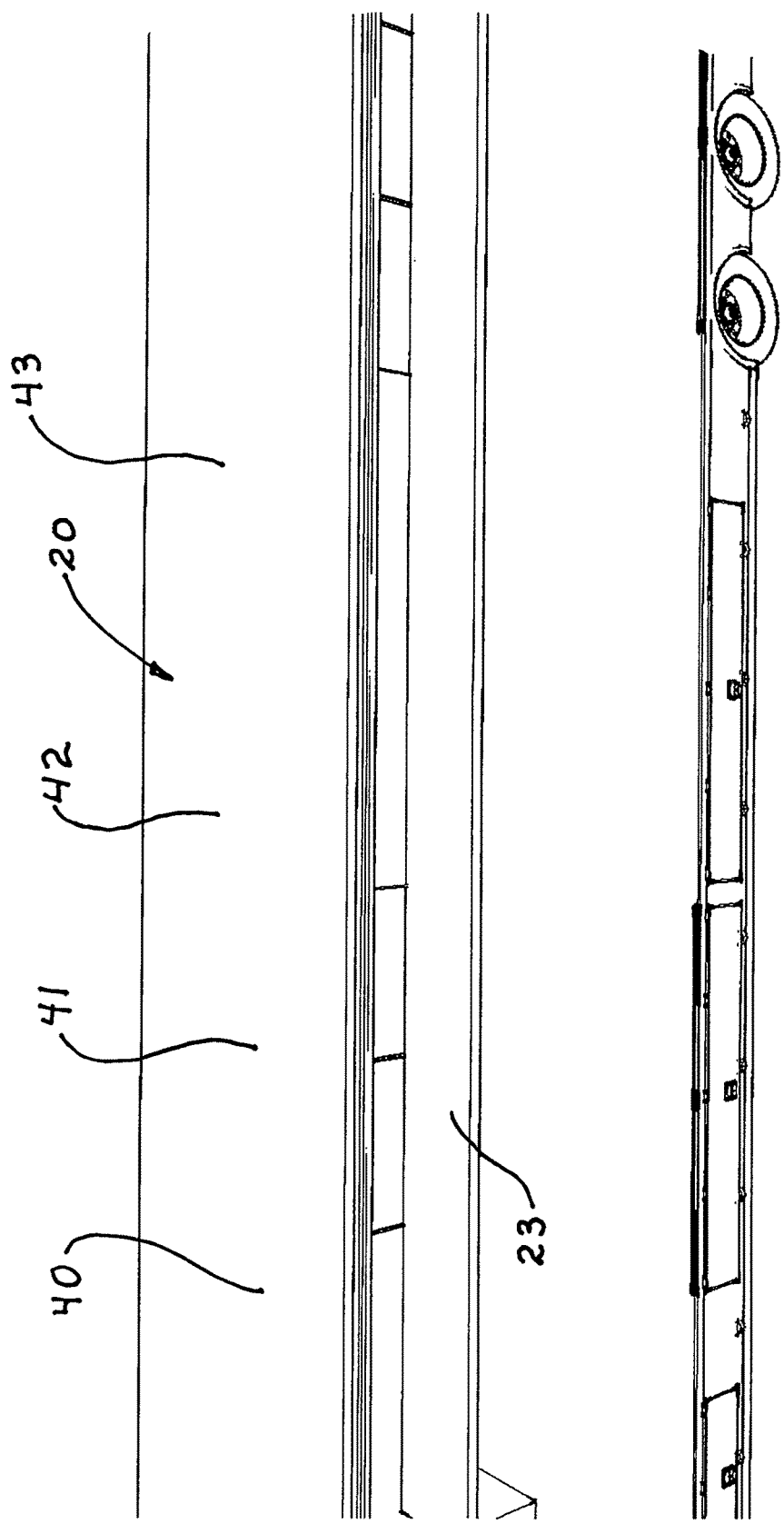
FIG. 6 sets forth a partial section view of the filling and packaging unit of the present invention mobile bottling and distribution system.

FIG. 6 sets forth a partial section view of filling and packaging unit 20. A bottling line 23 is supported within filling and packaging unit 20 which will be understood to represent an automated bottling apparatus constructed in accordance with conventional and/or customized fabrication techniques. In addition, a plurality of overflow reclamation floor segments underlie bottling line 23 which function to recover liquid spilled in the high speed bottling process. It will be further understood that a variety of bottling equipment combinations may be utilized within filling and packaging unit 20 without departing from the spirit and scope of the present invention.

Due to the small footprint of land required and the high efficiency of operation the self-contained completely mobile character of the inventive system facilitates a "circuit" approach to distribution. In this circuit approach, the inventive system is repeatedly moved from one location to another after short operational times. It is anticipated that brief periods of operation at a substantial number of locations will meet the localized demand for the bottled liquid product and allow the system to be subsequently moved to the next location. In this manner, a relatively large distribution area may be serviced in an extremely efficient and low cost operation. The fact that the entire system is entirely self-contained including supplies of material and operational power allows the system to utilize locations at which little if any support capability is required.

In further accordance with the present invention, an understanding of the nature of many commercial liquid products is helpful. For the most part, a great variety of liquid products which eventually appear on retail shelves or wholesale outlets are constituted of a combination of one, or more, concentrate ingredients together with a quantity of water. For example, DEF, described above, is formed by the combination of a concentrate, known as "prill", and a quantity of processed water. This combination of concentrate and processed water forms the product in its eventual useful form. Other products related to the vehicle industries are similarly constituted of a relatively small amount of a concentrate combined with a much larger quantity of processed water. Such products include windshield washer and solvent liquids, engine coolants, and various vehicle and automotive cleaning products. In other industries, such as the food industries, numerous products are also constituted of a concentrate combined with a much larger quantity of processed water. Such products include, but are not limited to, beverages and juices. By way of further example, throughout the chemical industries, both industrial and home use products various cleaners, decontaminants and disinfecting materials as well as other industrial and household chemicals are fabricated using a relatively small amount of concentrate and a much larger amount of water.

One of the important aspects of the production, processing and shipping of such liquid products that is advantageously addressed by the present invention system is the recognition that many products thus constituted are, in essence, largely water. As is known, water is heavy, bulky and therefore costly to ship. In accordance with an important aspect of the present invention set forth below in greater detail, the inventive system facilitates the elimination or substantial reduction of the costs and difficulties associated with the shipping of such water blended products by providing localized mobile water processing and blending facilities which, similar to the above-described bottling and packaging facilities, is supported upon a plurality of over-the-road trailers which remain mobile and which may be moved from site to site. Utilizing such mobile and efficient water processing, mixing and blending capabilities, further enhances efficiencies in the present invention system by using the mobile bottling and packaging systems with mobile mixing, blending and water processing systems to avoid the high costs associated with shipping product that is essentially water. In this manner, a liquid product then requires simply the on-site provision of a bulk supply of the concentrate. The substantially lower cost transportation of the concentrate to the mobile facility and the use of local water which has been processed avoids a significant portion of the shipping costs and difficulties for liquids thus processed. In essence, this embodiment of the present invention system utilizes a mobile bottling and packaging system described above in FIGS. 1 through 6 in combination with the present invent mobile blending, mixing and water processing system described below in FIGS. 7 through 14.

Figure 7:
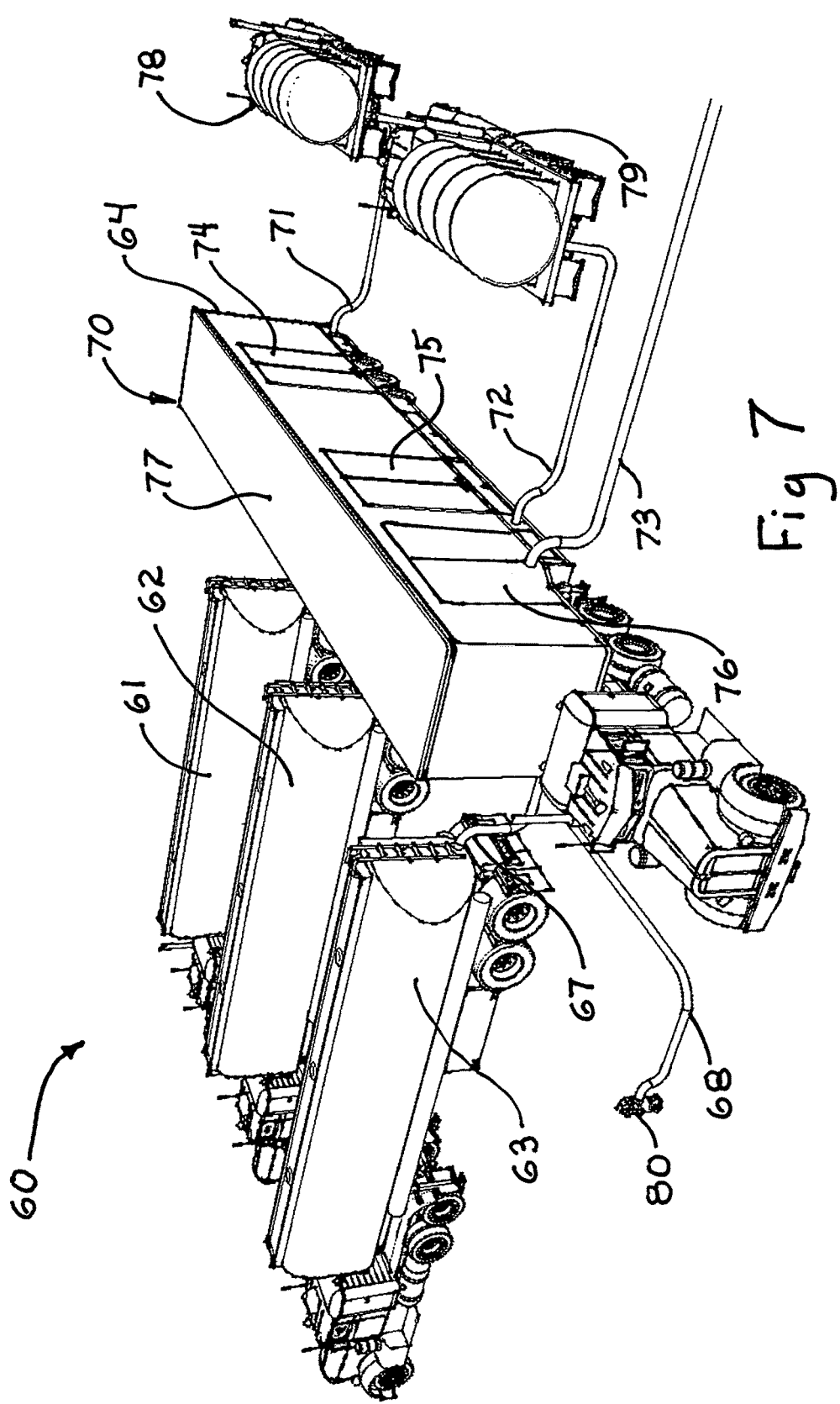
FIG. 7 sets forth a perspective view of an alternate embodiment of the present invention showing a mixing, blending and water processing system of the mobile bottling and distribution system constructed in accordance with the present invention.

FIG. 7 sets forth a perspective view of an alternate embodiment of the present invention showing a mobile mixing, blending and water processing system of the mobile bottling and distribution system constructed in accordance with the present invention generally referenced by numeral 60. System 60 is operative in combination with systems 10 and 50 set forth above in FIGS. 1 through 6. As described therein, systems 10 and 50 provide mobile efficient bottling, packaging, labeling and distribution of liquid products such as DEF, other vehicular chemicals, industrial chemicals and food products such as beverages and juices. The resulting combined system is highly efficient, requiring only a local water supply and supply of product concentrate to serve a selected area.

More specifically, system 60 includes a mixing, blending and water processing unit 70 supported within an over-the-road trailer 64 that has been fabricated in the manner described below in greater detail. Suffice it to note here that trailer 64 includes systems for water processing using deionization and reverse osmosis processes. Trailer 64 also supports a plurality of modular interchangeable skids, each having apparatus for mixing and blending one to three products. System 60 further includes a plurality of tanker trailers 61, 62 and 63 which provide a source of product concentrate. For purposes of illustration, system 60 is also shown having a pair of trucks 78 and 79 used for local wholesale or retail bulk product delivery. A local water supply, such as a municipal hydrant 80 is coupled to mixing, blending and water processing unit 70 by a connecting hose 68.

Figure 10:
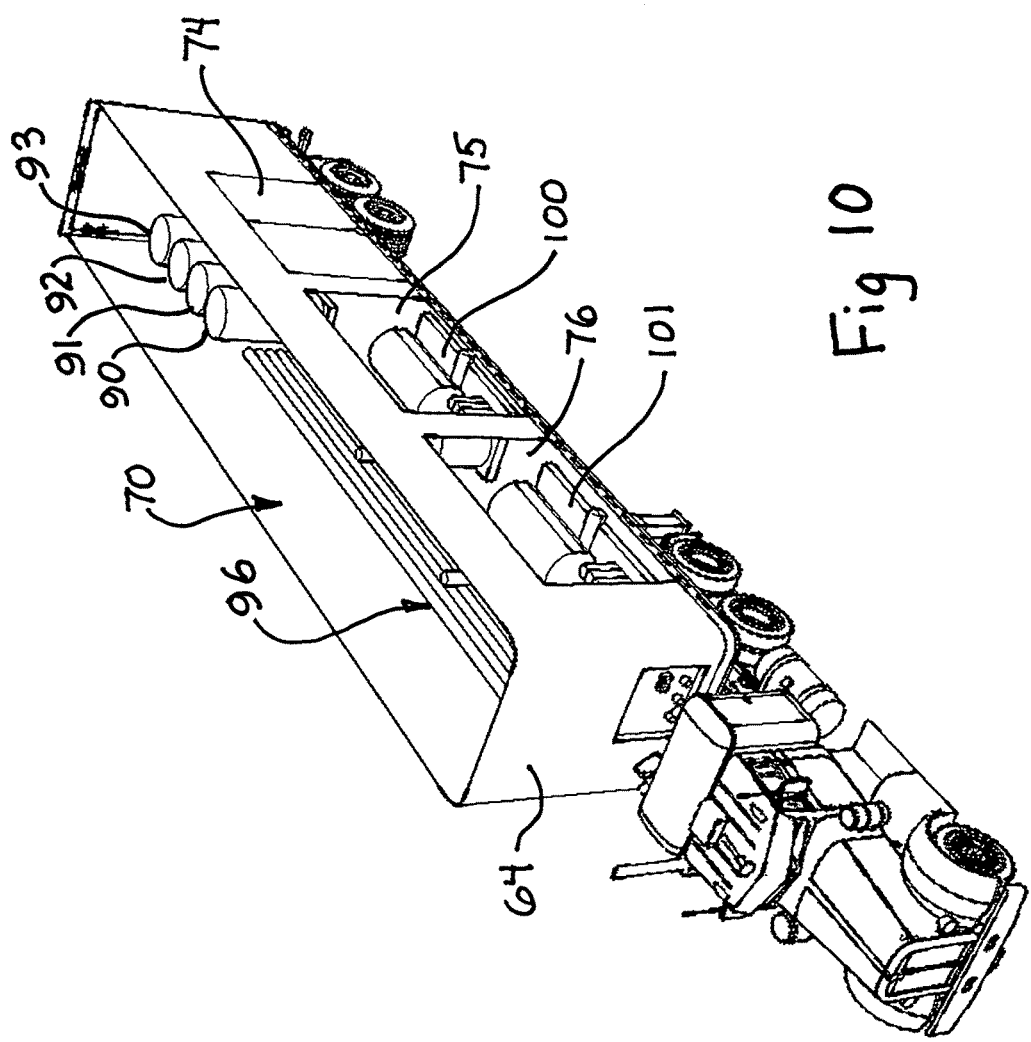
FIG. 10 sets forth a perspective view of a water processing and blending trailer used in the alternate embodiment of the present invention mixing, blending and water processing system of the mobile bottling and distribution system constructed in accordance with the present invention.

Trailer 64 of mixing, blending and water processing unit 70 further defines a plurality of access doors 74, 75 and 76 which, as is shown below in FIG. 10 provide access to the interior of trailer 70. Tanker trailers 61, 62 and 63 are coupled to mixing, blending and water processing unit 70 by hoses 65, 66 and 67 (seen in FIG. 10) respectively. Mixing, blending and water processing unit 70 is coupled to trucks 78 and 79 by hoses 71 and 72 respectively. Mixing, blending and water processing unit 70 is also coupled to bottling and filling unit 20 (seen in FIG. 1) by a hose 73.

Figure 8:
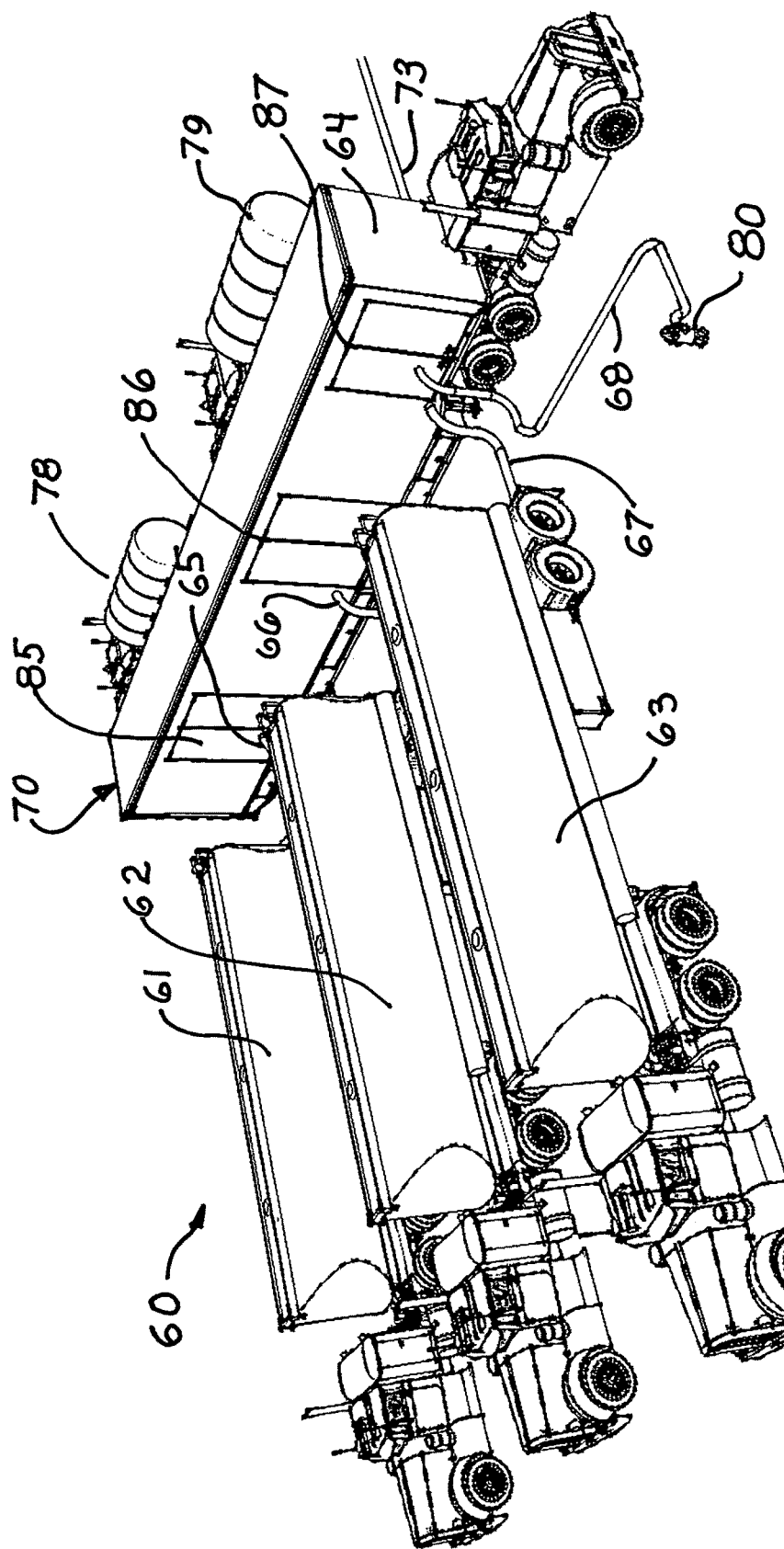
FIG. 8 sets forth a further perspective view of an alternate embodiment of the present invention showing a mixing, blending and water processing system of the mobile bottling and distribution system constructed in accordance with the present invention.

FIG. 8 sets forth a further perspective view of the alternate embodiment of the present invention showing a mixing, blending and water processing system of the mobile bottling and distribution system constructed in accordance with the present invention. As described above, system 60 includes a mixing, blending and water processing unit 70 supported within an over-the-road trailer 64 that has been fabricated in the manner described below in greater detail. Suffice it to note here that trailer 64 includes systems for water processing using deionization and reverse osmosis processes. Trailer 64 also supports a plurality of modular interchangeable skids, each having apparatus for mixing and blending one to three products. System 60 further includes a plurality of tanker trailers 61, 62 and 63 which provide a source of product concentrate. For purposes of illustration, system 60 is also shown having a pair of trucks 78 and 79 used for local wholesale or retail bulk product delivery. A local water supply, such as a municipal hydrant 80 is coupled to mixing, blending and water processing unit 70 by a connecting hose 68.

As is also described above, mixing, blending and water processing unit 70 further defines a plurality of access doors 85, 86 and 87 which, together with doors 74, 75 and 76, shown below in FIG. 10 provide access to the interior of trailer 70. Tanker trailers 61, 62 and 63 are coupled to mixing, blending and water processing unit 70 by hoses 65, 66 and 67 respectively. Mixing, blending and water processing unit 70 is coupled to trucks 78 and 79 by hoses 71 and 72 (seen in FIG. 9) respectively. Mixing, blending and water processing unit 70 is also coupled to bottling and filling unit 20 (seen in FIG. 1) by a hose 73.

Figure 9:
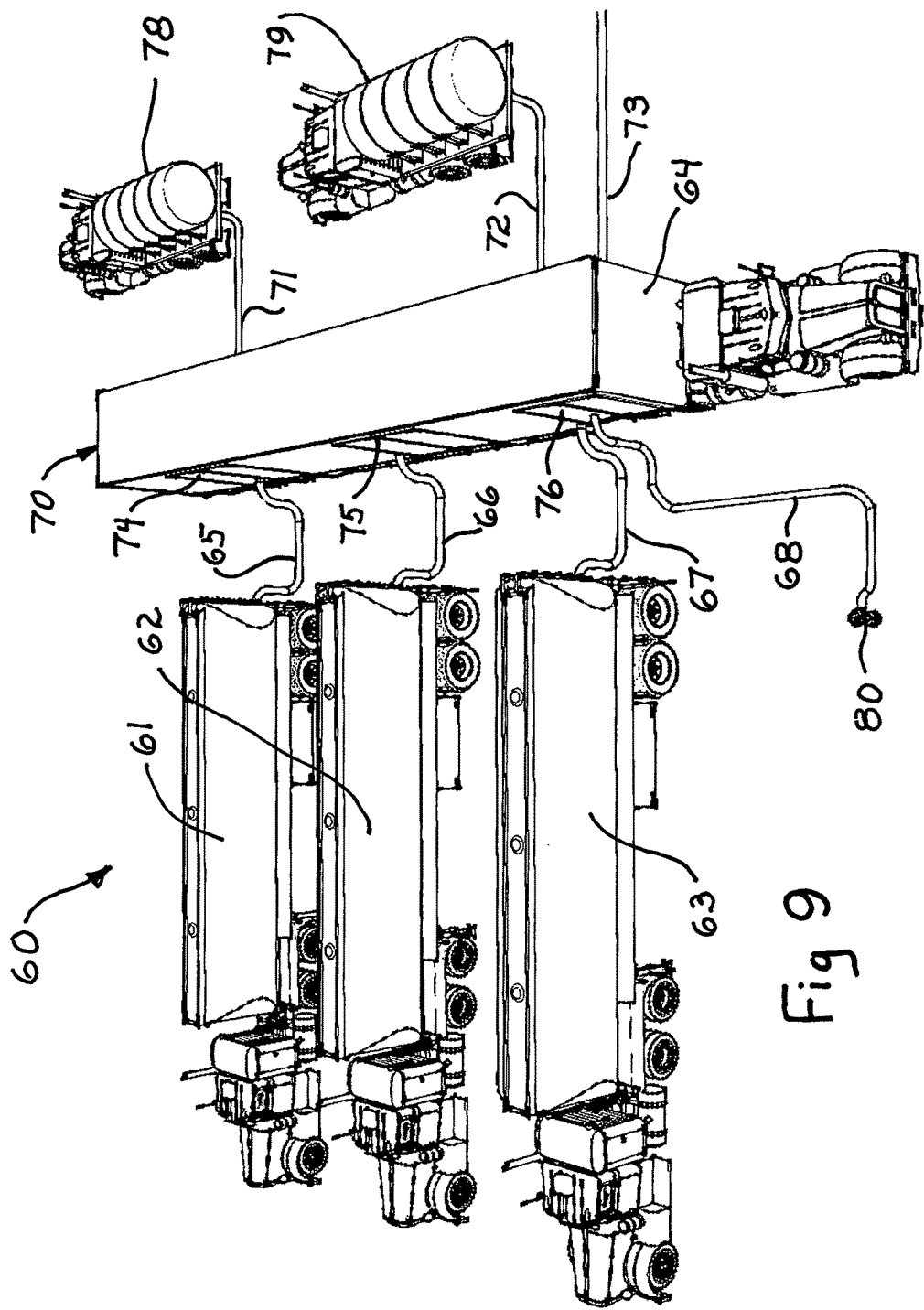
FIG. 9 sets forth a still further perspective view of an alternate embodiment of the present invention showing a mixing, blending and water processing system of the mobile bottling and distribution system constructed in accordance with the present invention.

FIG. 9 sets forth a still further perspective view of the alternate embodiment of the present invention showing a mixing, blending and water processing system of the mobile bottling and distribution system constructed in accordance with the present invention. As is described above, system 60 includes a mixing, blending and water processing unit 70 supported within an over-the-road trailer 64 that has been fabricated in the manner described below in greater detail. Suffice it to note here that trailer 64 includes systems for water processing using deionization and reverse osmosis processes. Trailer 64 also supports a plurality of modular interchangeable skids, each having apparatus for mixing and blending one to three products. System 60 further includes a plurality of tanker trailers 61, 62 and 63 which provide a source of product concentrate. For purposes of illustration, system 60 is also shown having a pair of trucks 78 and 79 used for local wholesale or retail bulk product delivery. A local water supply, such as a municipal hydrant 80 is coupled to mixing, blending and water processing unit 70 by a connecting hose 68.

Trailer 70 further defines a plurality of access doors 74, 75 and 76 which provide access to the interior of trailer 70. Tanker trailers 61, 62 and 63 are coupled to mixing, blending and water processing unit 70 by hoses 65, 66 and 67 (seen in FIG. 10) respectively. Mixing, blending and water processing unit 70 is coupled to trucks 78 and 79 by hoses 71 and 72 respectively. Mixing, blending and water processing unit 70 is also coupled to bottling and filling unit 20 (seen in FIG. 1) by a hose 73.

FIG. 10 sets forth a perspective view of mixing, blending and water processing unit 70 used in the alternate embodiment of the present invention of the mobile bottling and distribution system constructed in accordance with the present invention. For purposes of illustration, FIG. 10 shows trailer 64 having trailer roof 77 (seen in FIG. 7) removed to expose the interior of the trailer. Trailer 64 of mixing, blending and water processing unit 70 further defines a plurality of access doors 74, 75 and 76 which, as is shown below in FIG. 10 provide access to the interior of trailer 64. Trailer 64 supports a plurality of modular interchangeable mixing and blending units 100 and 101 each supported on a skid. Each skid is removably securable within the interior of trailer 64. Trailer 64 further supports a plurality of deionized water tanks 90, 91, 92, 93, 94, and 95. Tanks 94 and 95 seen in FIG. 12. A reverse osmosis water filtration system 96 is also supported within the interior of trailer 64. Mixing and blending units 100 and 101 are illustrative of a variety of mixing and blending units which may process one to three liquid products without cross contamination. Preferably, processing multiple liquids is limited to products that are related in use, such as all vehicle products or all food products to reduce the extent of cleaning involved.

Figure 11:
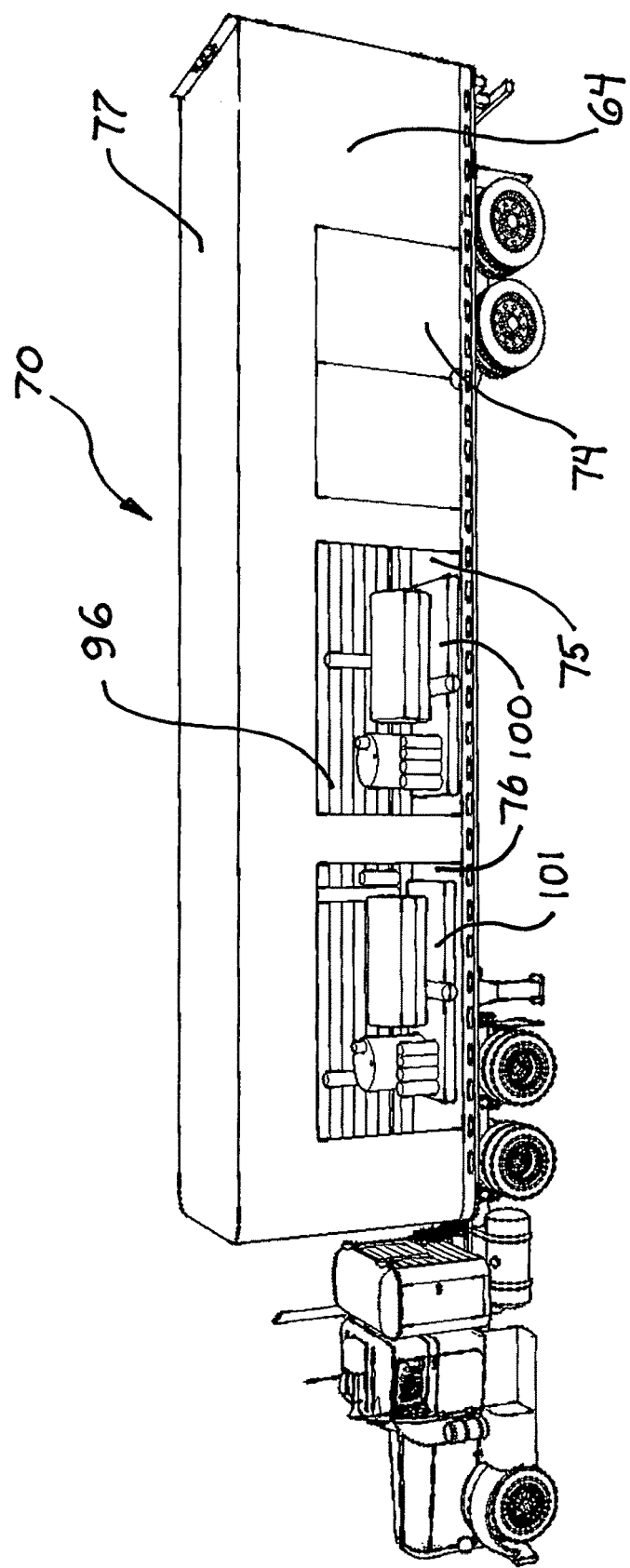
FIG. 11 sets forth a side perspective view of a water processing and blending trailer used in the alternate embodiment of the present invention mixing, blending and water processing system of the mobile bottling and distribution system constructed in accordance with the present invention.

FIG. 11 sets forth a side perspective view of mixing, blending and water processing unit 70 used in the alternate embodiment of the present invention. Mixing, blending and water processing unit 70 includes a trailer 64 which, as described above, further defines a plurality of access doors 74, 75 and 76 which provide access to the interior of trailer 64. Trailer 64 supports a plurality of modular interchangeable mixing and blending units 100 and 101 each supported on a skid. Each skid is removably securable within the interior of trailer 64. Trailer 64 further supports a plurality of deionized water tanks 90, 91, 92, 93, 94, and 95. Tanks 94 and 95 seen in FIG. 12. A reverse osmosis water filtration system 96 is also supported within the interior of trailer 64.

Figure 12:
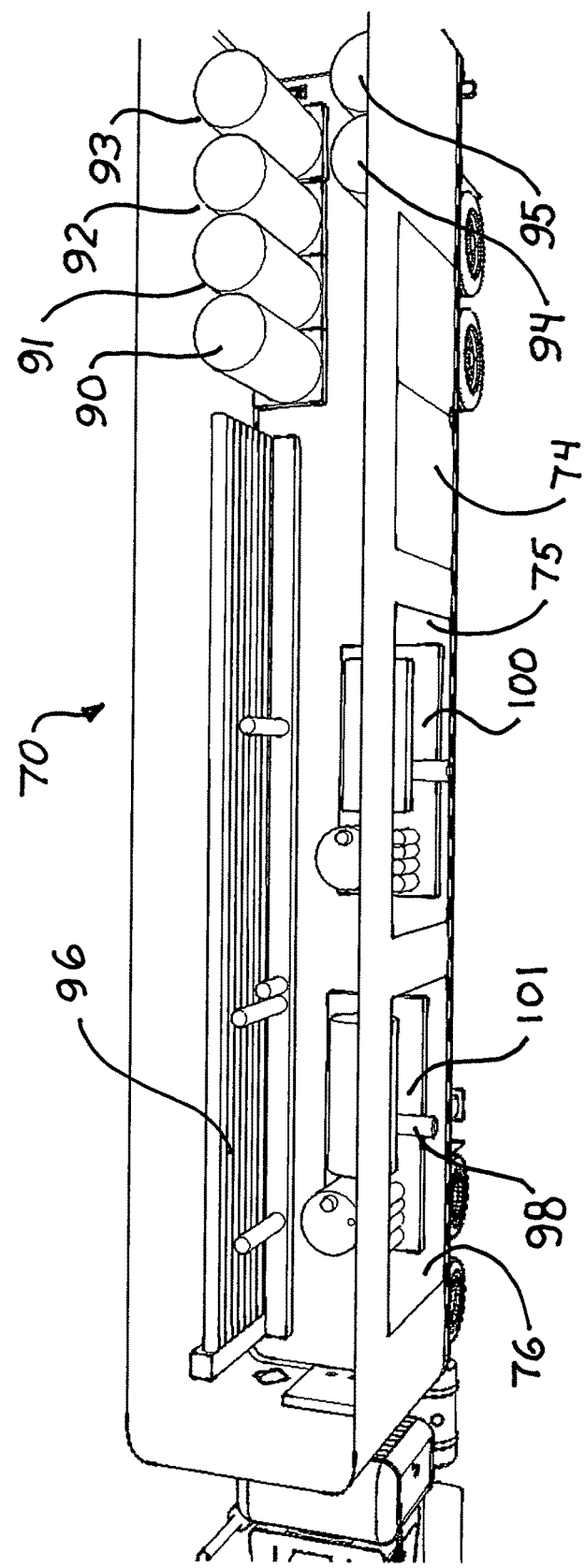
FIG. 12 sets forth a top perspective view of a water processing and blending trailer used in the alternate embodiment of the present invention mixing, blending and water processing system of the mobile bottling and distribution system constructed in accordance with the present invention.

FIG. 12 sets forth a top perspective view of the present invention mixing, blending and water processing system of the mobile bottling and distribution system constructed in accordance with the present invention. FIG. 12 shows trailer 64 having roof 77 removed to better show the interior of trailer 64. As is described above, mixing, blending and water processing unit 70 includes a trailer 64 which, as described above, further defines a plurality of access doors 74, 75 and 76 which provide access to the interior of trailer 64. Trailer 64 supports a plurality of modular interchangeable mixing and blending units 100 and 101 each supported on a skid. Each skid is removably securable within the interior of trailer 64. Trailer 64 further supports a plurality of deionized water tanks 90, 91, 92, 93, 94, and 95. A reverse osmosis water filtration system 96 is also supported within the interior of trailer 64.

Figure 13:
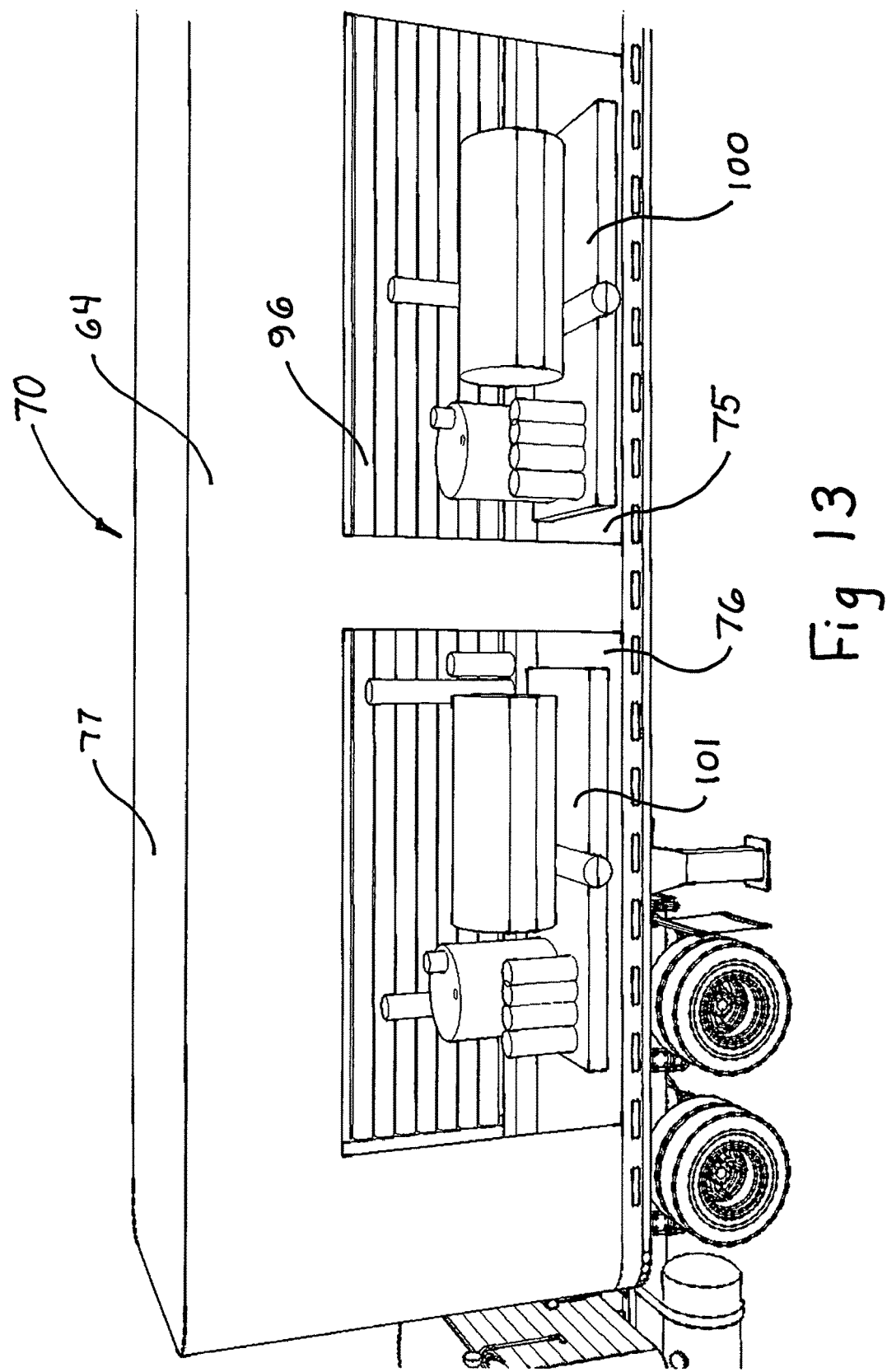
FIG. 13 sets forth an enlarged partial perspective view of a water processing and blending trailer used in the alternate embodiment of the present invention mixing, blending and water processing system of the mobile bottling and distribution system constructed in accordance with the present invention.

FIG. 13 sets forth an enlarged partial perspective view of mixing, blending and water processing unit 70. As is described above, mixing, blending and water processing unit 70 includes a trailer 64 which, as described above, further defines a plurality of access doors 74, 75 and 76 which provide access to the interior of trailer 64. Trailer 64 supports a plurality of modular interchangeable mixing and blending units 100 and 101 each supported on a skid. Each skid is removably securable within the interior of trailer 64. A reverse osmosis water filtration system 96 is also supported within the interior of trailer 64. FIG. 13 is provided to better illustrate the ease with which modular interchangeable mixing and blending units, such as units 100 and 101 may be installed and removed from trailer 64 through access doors 75 and 76.

FIG. 14 sets for an enlarged partial perspective view of mixing, blending and water processing unit 70 showing module 101 in the process of removal. As is described above, mixing, blending and water processing unit 70 includes a trailer 64 which, as described above, further defines a plurality of access doors 74, 75 and 76 (door 74 seen in FIG. 1) which provide access to the interior of trailer 64. Trailer 64 supports a plurality of modular interchangeable mixing and blending units 100 and 101 each supported on a skid. Each skid is removably securable within the interior of trailer 64. A reverse osmosis water filtration system 96 is also supported within the interior of trailer 64. FIG. 14 is provided to better illustrate an intermediate step in the removal of modular interchangeable mixing and blending units, such as unit 101 It will be apparent to those skilled in the art that the skid mounted modular units may be installed and removed from trailer 64 through access doors 75 and 76 in the manner shown in FIG. 14 using conventional loaders (not shown).

What has been shown is a mobile bottling and distribution system that improves the efficiency and lowers the overall operating costs associated with the bottling, shipping and distribution of large volume liquid products by providing a plurality of smaller self-contained facilities which are preferably housed upon a plurality of over the road type trailers each being capable of being moved from location to location by conventional over the road tractors.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A liquid product system comprising:
    a molding and packaging unit supported upon a first mobile trailer;
    a filling and palletizing unit supported upon a second mobile trailer;
    a delivery unit supported upon a third mobile trailer;
    a first bridge connecting said molding and packaging unit and said filling and palletizing unit;
    a second bridge connecting said filling and palletizing unit to said delivery unit;
    a source of bulk liquid product coupled to said filling and palletizing unit,
    a mixing and blending unit supported upon a fourth trailer having a hose coupled to said filling and palletizing unit;
    at least one tanker trailer having a quantity of liquid product concentrate therein coupled to said mixing and blending unit;
    a water deionizing apparatus supported within said mixing and blending unit;
    a reverse osmosis filter supported within said mixing and blending unit;
    a plurality of blending and mixing modules removably supported within said mixing and blending unit; and
    a water supply hose coupling said mixing and blending unit to a local source of water;
    said bulk liquid product being bottled within said filling and palletizing unit using bottles from said molding and packaging unit and thereafter transferred to said delivery unit for shipment, and
    said molding and packaging unit, said filling and palletizing unit, said delivery unit, said mixing and blending unit, and said first and second bridges being transported upon said first, second, third and fourth mobile trailers to be moved from operational location to successive operational locations, and
    said blending and mixing modules being interchangeable with other blending and mixing modules, each supporting concentrate supply tanks and water to concentrate mixers to produce completed liquid product, whereby said liquid product system may be changed from one liquid product to another by changing said blending and mixing modules.

2. The liquid product system set forth in claim 1 wherein said filling and palletizing unit includes a liquid product bottling line and wherein said molding and packaging unit includes a bottle molding apparatus to supply said bottles to said filling and palletizing unit.

3. The liquid product system set forth in claim 2 wherein said source of bulk product includes a tanker trailer filled with said liquid product and coupled to said filling and palletizing unit.

4. The liquid product system set forth in claim 3 wherein said source of bulk product includes a tanker railroad car filled with said liquid product and coupled to said filling and palletizing unit.

* * * * *